United States Patent [19]

Harmuth

[11] Patent Number: 4,651,152

[45] Date of Patent: Mar. 17, 1987

[54] LARGE RELATIVE BANDWIDTH RADAR

[75] Inventor: Henning F. Harmuth, Glen Echo, Md.

[73] Assignee: Geophysical Survey Systems, Inc., Hudson, N.H.

[21] Appl. No.: 535,678

[22] Filed: Sep. 26, 1983

[51] Int. Cl.$^4$ ............................................. G01S 13/66
[52] U.S. Cl. ........................................ 342/13; 342/27
[58] Field of Search ............ 343/5 PD, 17.1 R, 18 R, 343/18 A, 18 B, 18 E, 17.1 PW, 5 R, 55 A, 17.2 R

[56] References Cited

U.S. PATENT DOCUMENTS

| | | | |
|---|---|---|---|
| 3,311,914 | 5/1967 | Barringer | 343/55 A |
| 3,500,395 | 3/1970 | Foster et al. | 343/5 R |
| 4,415,898 | 11/1983 | Gaunaurd et al. | 343/55 A |

Primary Examiner—T. H. Tubbesing
Assistant Examiner—Gilberto Barrón, Jr.
Attorney, Agent, or Firm—Louis Orenbuch

[57] ABSTRACT

A method of detecting an object that may be coated with material for preventing or attenuating reflections of incident electromagnetic waves is disclosed in which pulses of electromagnetic wave energy are generated with a large relative bandwidth in the band from about 0.1 GHz to about 12.0 GHz. Preferably, the generated pulses have a pulse duration in the range from 0.1 nanosecond to 1 nanosecond. Those pulses of electromagnetic wave energy are directed toward the object and reflections of those pulses of electromagnetic wave energy which are incident on the object are detected by receiving apparatus. The method enables coated objects to be differentiated from uncoated objects.

3 Claims, 12 Drawing Figures

LARGE RELATIVE BANDWIDTH RADAR

This invention relates in general to the detection of an object by the reception of electromagnetic energy reflected from the object. More particularly, the invention pertains to a method of detecting an object that may be coated with a material intended to absorb electromagnetic energy or otherwise prevent reflections of incident electromagnetic energy.

BACKGROUND OF THE INVENTION

The elimination or reduction of radar returns by the use on the target of materials that absorb electromagnetic energy at radar frequencies has been the subject of discussion at least since the time radar was widely used for military purposes in the second World War. That subject is discussed at pages 69 to 73, Volume 1 of the Radiation Laboratory Series, in the book titled Radar System Engineering, published in 1947 by McGraw-Hill Book Company. It is pointed out in that discussion that absorbers, in general, are of two types. The first type of absorber causes reflections occurring at the front surface of a layer of absorbing material to be canceled by destructive interference from waves that penetrate into the layer and are reflected back to the front surface. The second type of absorber is matched to the transmission medium, which usually is air, so that ideally there is no reflection of the incident electromagnetic wave energy at the front surface and all the wave energy that enters, ideally, is absorbed by the layer.

In recent times, instances of the use of absorbing materials on "spook" aircraft to make the aircraft invisible to radar have been reported. There is consequently a need for an improvement in radar to enable "spook" objects to be detected. This invention resides in a method of detecting such objects.

In the practice of the invention, short pulses of electromagnetic wave energy, preferably within the range of 1 nanosecond to 0.1 nanosecond pulse duration, having large relative bandwidth in the band from about 0.1 GHz to about 12.0 GHz are repetitively generated and directed by a scanning antenna or by a fixed directional antenna into the space to be monitored. Reflections of the pulsed wave energy from objects in the monitored space are then detected by a receiver. From tnose reflections, spook objects can be detected along with objects not having an absorptive coating. By operating in accordance with the invention, a coating of absorbing material, to be effective, must be so thick that it becomes impractical to provide a vehicle with a coating of the requisite thickness.

THE DRAWINGS

FIG. 1 schematically depicts a metal plate coated with electromagnetic wave energy absorbing material whose wave impedance Z is closely matched to the wave impedance $Z_o$ of air and whose high absorption suppresses the wave reflected from the metal surface.

DETAILED EXPOSITION OF THE INVENTION

I. Introduction

Figure 1:
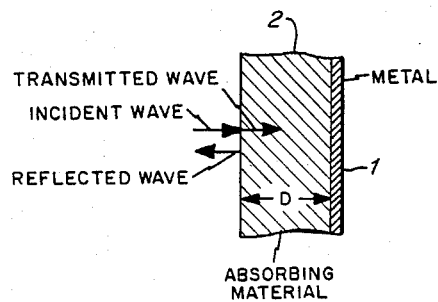

It is well known that a covering of absorbing material on a metallic surface can substantially reduce the energy of a returned radar signal. The primary application of absorbing materials is the attenuation of electromagnetic waves backscattered by metals or by other highly electrically conductive materials. In the context of this exposition, the terms "metal" and "metallic" mean material having high electrical conductivity and those terms are not intended to be restricted to those substances which chemically are classified as metals.

The simplest absorbing materials are characterized by their conductivity $\sigma$, permeability $\mu$, permitivity $\epsilon$. The losses are, in this case, caused by the conductivity $\sigma$. More complicated materials may use hysteresis losses of e:ther $\mu$ or $\epsilon$, for which ferrite absorbers are the typical example. Furthermore, one may use molecular resonances, for which the resonances of the oxygen molecule around 60 GHz are an example. The discussion which follows is restricted to materials characterized by constants $\sigma$, $\mu$, and $\epsilon$.

The impedance of the absorbing material must be matched to the electromagnetic impedance $Z_o$ of empty space or air. In addition, the absorbing material must attenuate the wave very effectively in order to keep its thickness to a practical value. One will expect that such requirements are hard to meet over a large frequency range or-more precisely-for a large relative bandwidth. To clarify the last statement, let us observe that absorbing materials working form 90 to 100 GHz or from 0.5 to 10.5 GHz both cover the same absolute bandwidth of 10 GHz, but the relative bandwidth is much larger in the second case; one will expect that a match of impedance and absorption from 0.5 to 10.5 GHz is more difficult than from 90 to 100 GHz.

The relative bandwidth $\eta$ can be defined in a number of ways. We use the definition $$\eta = \frac{f_H - f_L}{f_H + f_L} \qquad (1)$$

where $f_H$ is the highest and $f_L$ the lowest frequency of interest.

Note that we have to use the poorly defined concepts of highest and lowest "frequency of interest," since any signal in the real world has a beginning and an end, which implies that its exact upper frequency limit is infinite. For $f_H \to \infty$, one always obtains $\eta = 1$ from equation (1). The problem is caused by the infinitely long sinusoidal functions on which Fourier analysis-as well as the concept of frequency-is based. The limitations of Fourier analysis rarely cause problems when one deals with signals having a small relative bandwidth, but this is quite different for signals with large relative bandwidth.

Typical signals used in radar have relative bandwidths in the order of $\eta = 0.01$ or less, an amplifier specified from $f_L = 0.1$ GHz to $f_H = 2$ GHz yields $\eta = (2-0.1)/(2+0.1) = 0.9$, and a dc amplifier specified from $f_L = 0$ to an arbitrary frequency $f_H$ yields $\eta = 1$, which is the largest value permitted by the definition. Many commercially available components, such as coaxial cables, hybrid couplers, attenuators, and frequency-independent antennas have relative bandwidths either close to one or at least much larger than the typical relative bandwidths of conventional radar and radio signals. Generally speaking, only circuits and structures designed to resonate with sinusoidal signals have a small relative bandwidth, since the phenomenon or resonance disappears with increasing relative bandwidth. As used herein the term "sinusoidal" includes those signals which approach sinusoidal form.

Let us observe that a pure sinusoidal wave yields $f_H - f_L$, and relative bandwidth $\eta = 0$. For increasing values of $\eta$, a signal looks less and less like a sinusoidal function.

II. Reflection of Short Pulses by a Layered Medium

FIG. 1 shows a metal plate 1, covered with a coat 2 of absorbing material. Let a wave arrive with perpendicular incidence from the left. The wave reflected to the left consists of the superposition of the wave reflected from the exposed surface of the absorbing material and from the metal surface. In the conventional theory, both waves are sinusoids, having different amplitudes and phases, and they sum up to a reflected sinusoidal wave. The whole process is based on the assumption of infinitely extended sinusoidal waves.

Consider now the reflection of a nonsinusoidal wave. We use the idealized waveform of the rectangular pulse, just as tne conventional theory uses the idealized waveform of a sinusoidal function. Since an electromagnetic wave cannot have a dc component, we may think that the rectangular pulse is followed some time later by an amplitude reversed but otherwise equal pulse. The discussion given here for the first pulse applies then to the second pulse too, if one allows for the amplitude reversal. There is no interference between the two pulses if they are sufficiently far apart, and it is thus correct to treat them individually as we do here. Let such a pulse of duration $\Delta T$ be the incident wave in FIG. 1. We assume first that neither the reflection nor the attenuation in the absorbing material shall cause distortions and that the amplitude of the magnetic rather than the electric field strength is reversed by the reflection at the exposed surface of the absorbing coat. The time variation of the electric field strength reflected at the surface of the absorbing coat is then given by $e_1(t)$ in FIG. 2(a). We have a pulse of duration $\Delta T$ and with amplitude A. The electric field strength of the pulse reflected by the metal surface is polarity reversed, has the amplitude B, and the delay $\Delta T'$ as shown by $e_2(t)$ in FIG. 2(a). The sum $e_1(t) + e_2(t)$ at any point left of the air-absorber interface is the time variation $e_r(t)$ of the electric field strength of the total reflected wave as shown in FIG. 2(a).

It is immediately evident from FIG. 2(a) that the least energy will be reflected for $A = -B$ and a small value of the delay time $\Delta T'$. This case is shown in FIG. 2(b). We say that reflection and absorption are matched for $A = -B$. A small value of $\Delta T'$ can be achieved by making the absorbing coat thin and the propagation velocity of the wave in the coat high. These two requirements are difficult to reconcile with the also-required high attenuation by absorption.

Figure 2:
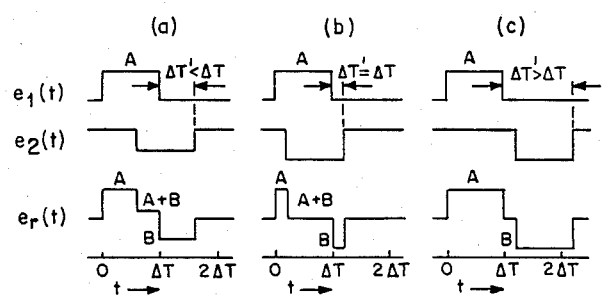
FIG. 2 shows the reflection of a rectangular pulse occurring in the FIG. 1 structure at the surface of the absorber and at the surface of the metal plate. Pulse $e_1(t)$ is reflected at the exposed surface of the absorber; pulse $e_2(t)$ at the metal surface; pulse $e_r(t)$ is their sum.
Figure 3:
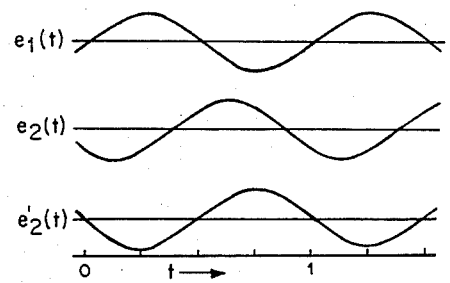
FIG. 3 illustrates suppression of the reflection of a sinusoidal wave by the FIG. 1 structure.

Instead of the rectangular pulses of FIG. 2, consider the sinusoidal wave of FIG. 3. Again, $e_1(t)$ is the time variation of the electric field strength reflected from the external surface of the aosorbing material in FIG. 1, and, at tne same place, $e_2(t)$ is the time variation of the electric field strength reflected from the metal surface. The amplitude of both waves is made equal by matching reflection and absorption of the absorbing coating. However, the time shift between $e_1(t)$ and $e_2(t)$ is such that their sum will not cancel. By using an absorbing material that not only matches reflection and absorption but also permits a controlled phase shift, one can change $e_2(t)$ to $e_2'(t)$ so that the sum $e_1(t) + e_2'(t)$ is zero. (This is true only for infinitely long sinusoidal waves. Sinusoidal pulses with 100 to 1000 cycles-as used in radar-would still show a reflection at beginning and end similar to FIG. 2(b).) This can never happen with the rectangular pulse of FIG. 2(b). We see from this example that it is more difficult to protect a metallic surface against signals with large relative bandwidth than against signals with a relative bandwidth $\eta = 0$ or a small relative bandwidth.

Consider the duration $\Delta T = 0.1$ ns for the rectangular pulses $e_1(t)$ and $e_2(t)$ in FIG. 2. An electromagnetic wave in vacuum propagates 3 cm during this time; the round-trip distance for a radar signal is 1.5 cm. The velocity of propagation in an absorbing material is typically slower than in vacuum. Hence, even a coat of only a few millimeter thickness will make it impossible for the delay time $\Delta T'$ in FIG. 2(a) and (b) to be smaller than $\Delta T$. The case $\Delta T' > \Delta T$ shown in FIG. 2(c) will generally apply. There is now no partial cancellation of the waves $e_1(t)$ and $e_2(t)$; the maximum of energy is returned. This feature makes pulses in the range of 0.1 to 1 ns desirable. An all-weather radar operating carrier-free in the approximate band 0.5 GHz<f<10.5 GHz can use such short pulses even though the conventional all-weather radar cannot use pulses shorter than about 10 ns.

Consider now distortions of the rectangular pulses by reflection and absorption. In the case of FIG. 2(b), one would have to match the two types of distortions in order to achieve cancellation during the time of overlap of $e_1(t)$ and $e_2(t)$. The distortion-free case seems to be the most difficult one for the radar engineer. In the case of FIG. 2(c), the distortions due to reflection and absorption will have to be matched to produce a positive and a negative pulse with equal energy and peak power; any mismatch will make the energy or the peak power of one pulse larger than of the other, and this pulse will be the easier one to detect. Again, the distortion-free case is the most difficult one for the radar engineer.

We may summarize two facts from FIG. 2: (a) one should match reflection and absorption $A = -B$ since the pulse with larger magnitude would otherwise determine detectability; (b) the amplitudes A and B of the pulses reflected by the absorbing material and the metallic surface are independent of each other, and we do not need the layered medium theory of sinusoidal waves for their calculation.

For the calculation, we consider the pulses $e_1(t)$ and $e_2(t)$ in FIG. 2(c) Fourier-transformed; in the case of FIG. 2(b), only the section $0 \leq t \leq \Delta T'$ of $e_1(t)$ and $\Delta T \leq t \leq \Delta T + \Delta T'$ of $e_2(t)$ are Fourier-transformed. We may then investigate the effect of reflection and absorption on the individual sinusoidal functions of the Fourier representation. We note that there seems to be a logical contradiction in this approach. The pulse $e_1(t)$ of finite duration in FIG. 2(c) is clearly reflected at the surface of the absorbing material in FIG. 1 without any interference by the pulse $e_2(t)$ reflected from the metal surface; in effect $e_1(t)$ has the same time variation as if the metal surface were not there and the absorbing coat were infinitely thick. On the other hand, the Fourier representation introduces infinitely long sinusoidal functions which obviously can never be reflected "as if the metal surface were not there." Hence, the metal surface causes an effect before the incident wave has even reached it. Such causality problems are inherent to Fourier analysis. They are due to the use of infinitely long functions to describe signals with a beginning and end. The best known example is the application of a step function to an idealized low-pass filter, that results in an output before the step function is applied. The pulse diagrams of FIG. 2 bring the two-layer problem into the form of one-layer problems to which we can apply Fourier analysis without contradicting the causality law.

Continuing with this approach, let us note that the pulses in FIG. 2 may be amplitude-modulated onto a sinusoidal carrier; for a conventional radar the period of the carrier would typically be between $\Delta T/100$ and $\Delta T/1000$. Our discussion of the time variation of $e_r(t)$ for small values of $\Delta T$ remains essentially unchanged; the two pulses of $e_r(t)$ in FIG. 2(c) would be replaced by two sinusoidal pulses with some 100–1000 cycles each, but they would not interfere with each other any more than the rectangular pulses.

III. Impedance-Matching for Electromagnetic Waves

For a planar wave with sinusoidal time variation propagating in the direction z, one obtains from Maxwell's equations the following expressions for the electric and magnetic field strengths $$e(z,t) = E e^{i(\omega t - kz)}, \quad h(z,t) = (E/Z) e^{i(\omega t - kz)} \quad (2)$$

$$k = [-i\omega\mu(i\omega\sigma+)]^{\frac{1}{2}} = \alpha - i\beta \quad (3)$$

$$Z = \omega\mu/k \quad (4)$$

where k is the wavenumber and Z the wave impedance of the medium in which the wave propagates; $\mu$, $\epsilon$, and $\sigma$ are the permeability constant, the dielectric constant, and the conductivity of the medium, respectively. The phase constant $\alpha$ and the attenuation constant $\beta$ can be expressed as follows:

$$\alpha = \omega(\epsilon\mu/2)^{\frac{1}{2}}[1 + (1 + \sigma^2/\omega^2\epsilon^2)^{\frac{1}{2}}]^{\frac{1}{2}} \quad (5)$$

$$\beta = \omega(\beta\mu/2)^{\frac{1}{2}}[-1 + (1 + \sigma^2/\omega^2\epsilon^2)^{\frac{1}{2}}]^{\frac{1}{2}} \quad (6)$$

Let $Z_o = 377 \, \Omega$ denote the wave impedance of air, and Z the wave impedance of an absorbing material as shown in FIG. 1. An incident wave $e_i(z,t)$ hits the material with angle of incidence zero; a reflected wave $e_r(z,t)$ and a transmitted wave $e_t(z,t)$ are produced. The ratio of the amplitudes of reflected to incident wave is given by the formula $$\frac{E_r}{E_i} = \frac{Z - Z_o}{Z + Z_o} = \left|\frac{E_r}{E_i}\right| e^{i\phi} \quad (7)$$

where Z can be written with the help of (4) to (6) as follows:

$$Z = \frac{\omega\mu}{k} = \frac{\omega\mu\alpha}{\alpha^2 + \beta^2}(1 + i\beta/\alpha) = Z_A(1 + i\beta/\alpha) \quad (8)$$

$$Z_A = \omega\mu\alpha/(\alpha^2 + \beta^2).$$

Using the substitutions $$\Omega = \omega\epsilon\sigma, \quad \alpha = (\mu/\epsilon)^{\frac{1}{2}}/Z_o = (\mu\epsilon_o/\mu_o\epsilon)^{\frac{1}{2}}, \quad s = (1 + 1/\Omega^2)^{\frac{1}{2}} \quad (9)$$

one obtains from (7)

$$\left|\frac{E_r}{E_i}\right| = \frac{2s(q^4 - 2q^2 + s^2)^{\frac{1}{2}}}{[q(1+s)^{\frac{1}{2}} + \sqrt{2}\, s]^2 + q^2(s-1)} \quad (10)$$

$$\tan \phi = \frac{2q(s^2 - 1)^{\frac{1}{2}}}{s[2q^2 - \sqrt{2}\,(s+1)]^{\frac{1}{2}}}. \quad (11)$$

Figure 4:
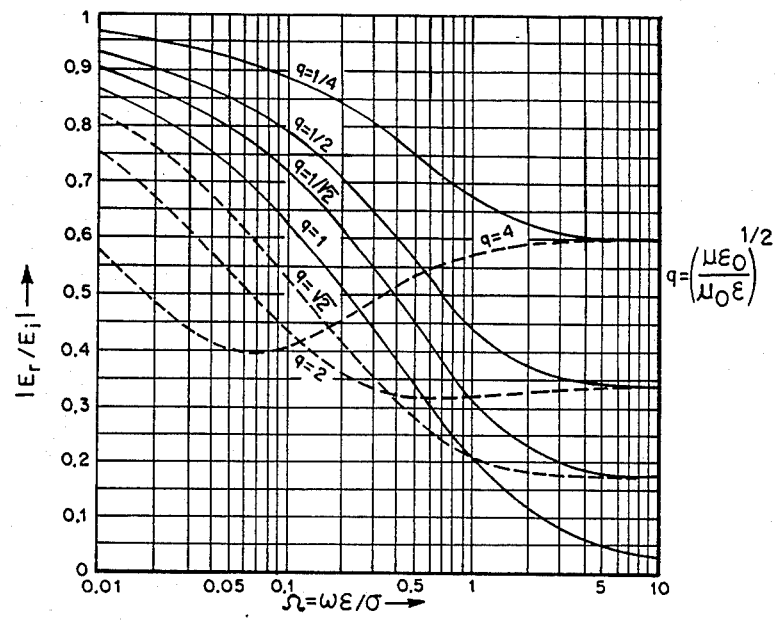
FIG. 4 is a graph of the ratio $|E_r/E_i|$ of the reflected to the incident wave as a function of the normalized frequency $\Omega$ and the parameter $q=(\mu\epsilon_o/\mu_o\epsilon)^{\frac{1}{2}}$.

The ratio $|E_r/E_i|$ is plotted in FIG. 4 as function of the normalized frequency $\Omega = \omega\epsilon/\sigma$ for various values of $q = (\mu\epsilon_o/\mu\epsilon_o)^{\frac{1}{2}}$. The choice $q = 1$ yields perfect impedance-matching for $\Omega \to \infty$. Generally, one obtains from (10) for $\Omega \to \infty$ $$\lim_{\Omega \to \infty} \left|\frac{E_r}{E_i}\right| = \frac{|q^2 - 1|}{(q+1)^2}. \quad (12)$$

Note that the two values $q = \xi$ and $q = 1/\xi$ yield the same result $$\frac{|1/\xi^2 - 1|}{(1/\xi + 1)^2} = \frac{|1 - \xi^2|}{(1 + \xi)^2} = \frac{|\xi^2 - 1|}{(\xi + 1)^2} \tag{13}$$

For $\Omega \to 0$, one obtains $|E_r/E_i| = 1$ for any value of q.

FIG. 4 shows that, for $q=2$ and $q=4$, one obtains minima at small values of the normalized frequency $\Omega$. However, the values $|E_r/E_i|$ of those minima equal about 0.3 and 0.4 and either is too large a value to make these minima practically interesting. The only way to achieve a sufficiently small reflection from the surface of the absorbing material in FIG. 1 is to operate at a large normalized frequency $\Omega$, and to make the ratio q as close as possible to 1.

Figure 5:
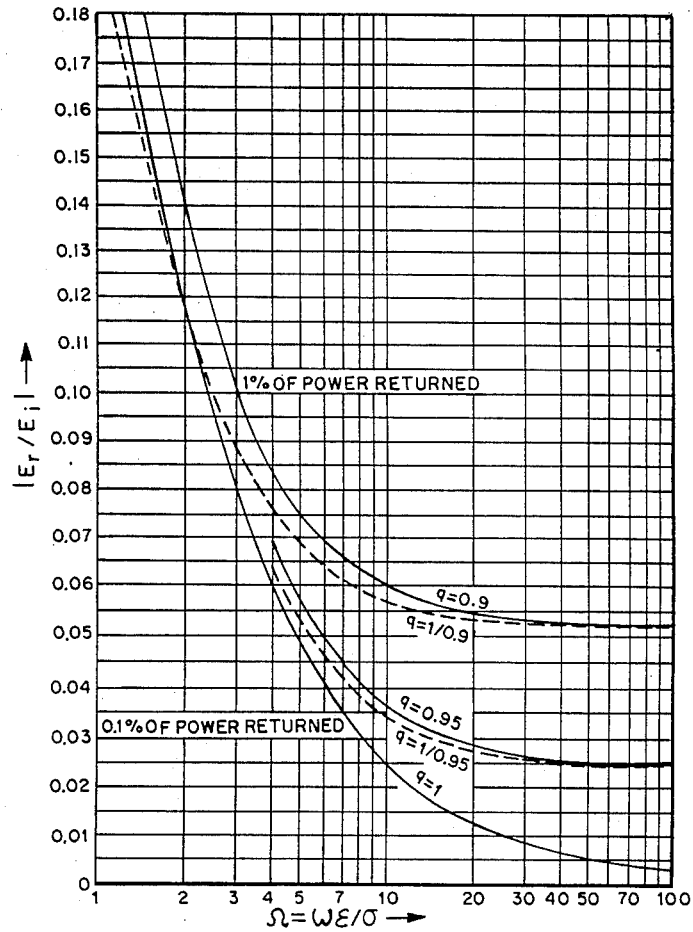
FIG. 5 is a graph showing an extension of FIG. 4 to larger values of the normalized frequency $\Omega$.

FIG. 5 shows an extension of FIG. 3 to larger values of $\Omega$. In addition to the curve for $q=1$, the curves for $q=0.9$, $1/0.9$, $0.95$, and $1/0.95$ are plotted, to show the importance of small deviations of q from the ideal value 1.

Figure 6:
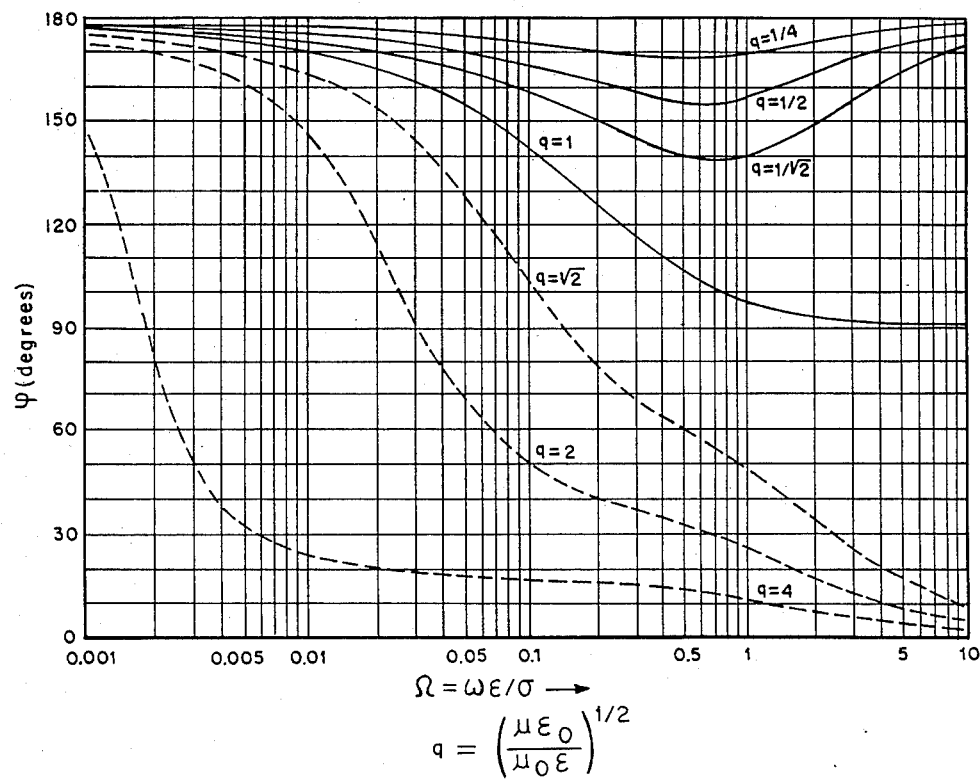
FIG. 6 is a graph showing the phase angle $\psi$ between the phasors $E_r$ and $E_i$ of the reflected and incident waves in FIG. 1 according to equation (11) as a function of the normalized frequency $\Omega$ and the parameter q.

FIG. 6 shows the phase angle between $E_r$ and $E_i$ in FIG. 1 according to (11) as function of the normalized frequency $\Omega$ for various values of the parameter q. For $q=1$, which implies that the reflected wave disappears for $\Omega \to \infty$, one obtains an amplitude reversal ($\psi \to 180°$) for small values of $\Omega$, and $\psi = 90°$ for $\Omega \to \infty$. Any other value of q also yields an amplitude reversal for $\Omega \to 0$, but for $\Omega \to \infty$ one obtains an amplitude reversal only for $q<1$, while $q>1$ yields the angle $\psi = 0$ between $E_r$ and $E_i$.

The ratio of the amplitudes of the incident and reflected magnetic field strengths $H_r/H_i$ is the same as that for the electric field strengths. Hence, if we are interestred in the fraction of the reflected power, we can take the square of the ratio $|E_r/E_i|$ in FIGS. 4 and 5. A ratio $|E_r/E_i| = 0.1$ implies that 1 percent of the incident power is returned, while a ratio $|E_r/E_i| = 0.032$ means that 0.1 percent is returned. FIG. 5 shows tnat the approximate values $\Omega \geq 2.5$ and $\Omega \geq 10$ are required to return less than 1 percent or 0.1 percent of the incident power for $q = (\epsilon\mu_o/\epsilon_o\mu)^{\frac{1}{2}} = 1$.

IV. Matching Impedance and Absorption

Consider once more FIG. 1. The wave $e_t(z,t)$ transmitted into the absorbing material reaches the surface of the metal. Due to the enormous value of the conductivity $\sigma$ for metals, one may assume that the wave is completely reflected, and travels once more through the absorbing material. According to (2) and (3), the electric and magnetic field strengths are attenuated by a factor $e^{-2\beta D}$ if the wave propagates twice the distance D through the absorbing material. We say the impedance and the absorption of the absorbing material are matrhed if the relation $$\left|\frac{E_r}{E_i}\right| = e^{-2\beta D} \tag{14}$$

is satisfied. In essence, this condition means that the power of tne wave returning from the surface of the absorbing material and from the surface of the metal are equal. The two powers are not *exactly* equal. For instance, if 1 percent of the power is reflected at the surface of the absorbing coating, only the fraction 0.99 of the incident power is transmitted into the absorbing coating. Similarly, when the wave reflected at the surface of the metal leaves the absorbing coating, only the fraction 0.99 of the power reaching the interface will be transmitted into the air. The definition of (14) thus makes the power returned from the metal surface equal to $0.99^2$ or 98 percent of the power returned from the surface of the absorbing coating. We do not need to be concerned here about such small differences, particularly since it is quite clear how they can be corrected if the need should arise.

From (14) follows the required thickness of the absorbing material:

$$D = -\frac{1}{2\beta} \ln\left|\frac{E_r}{E_i}\right| \tag{15}$$

$= 1.15/\beta$, for $|E_r/E_i| = 0.1$ or 1 percent of power reflection $= 1.73/\beta$, for $|E_r/E_i| = 0.032$ or 0.1 percent of power reflection According to FIG. 5, one obtains $\Omega = 2.5$ and 10 for a power reflection of 1 percent and 0.1 percent and $q=1$. From (6) follows:

$$1/\beta = \sqrt{2}\left(\frac{\epsilon}{\mu}\right)^{\frac{1}{2}} \frac{1}{\epsilon\omega}[-1 + (1 + 1/\Omega^2)^{\frac{1}{2}}]^{-\frac{1}{2}}. \tag{16}$$

FIG. 5 shows that one must try to make q equal to 1, which means that $(\mu/\epsilon)^{\frac{1}{2}}$ should equal the wave impedance $Z_o$ of empty space. We replace $\omega$ in (16) by $2\pi f$, and $\epsilon$ by the product $\epsilon_r\epsilon_o$ of relative and absolute dielectric constant $$\epsilon = \epsilon_r\epsilon_o = 8.859 \times 10^{-12}\epsilon_r \text{ [As/Vm]}. \tag{17}$$

One thus obtains from (16) the numerical relation $$1/\beta = 0.0674[-1 + (1 + 1/\Omega^2)^{\frac{1}{2}}(\epsilon_r f)^{-1} \tag{18}$$

$= 0.243/f\epsilon_r$, for $\Omega = 2.5$ or 1 percent power reflection $= 0.954/f\epsilon_r$, for $\Omega = 10$ or 0.1 percent power reflection where f must be inserted in gigahertz. With the help of (15), we obtain from (18) the required thickness D of the absorbing material in FIG. 1

$D=1.15/\beta=0.279/F\epsilon_r$, for 1 percent power reflection $D=1.73/\beta=1.65/f\epsilon_r$, for 0.1 percent power reflection (19)

where f has to be inserted in gigahertz to obtain D in meter.

Figure 7:
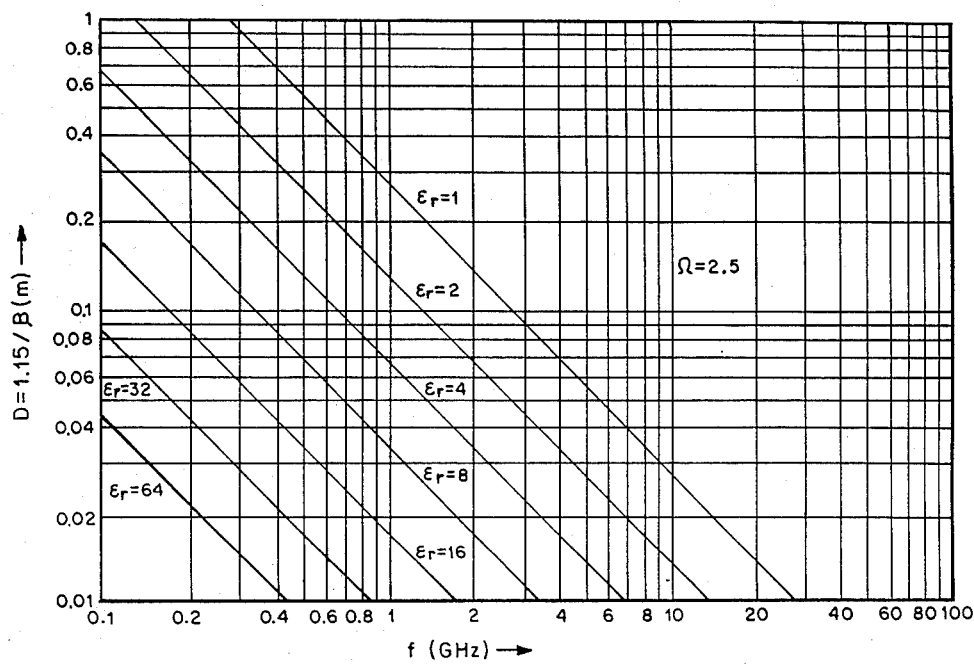
FIG. 7 is a graph of the thickness D of the absorbing material in FIG. 1 required for a value $\Omega=2.5$ —or an attenuation of tne power of the wave reflected at the metal surface by absorption to about 1 percent—as a function of the frequency and the relative dielectric constant $\epsilon_r$.
Figure 8:
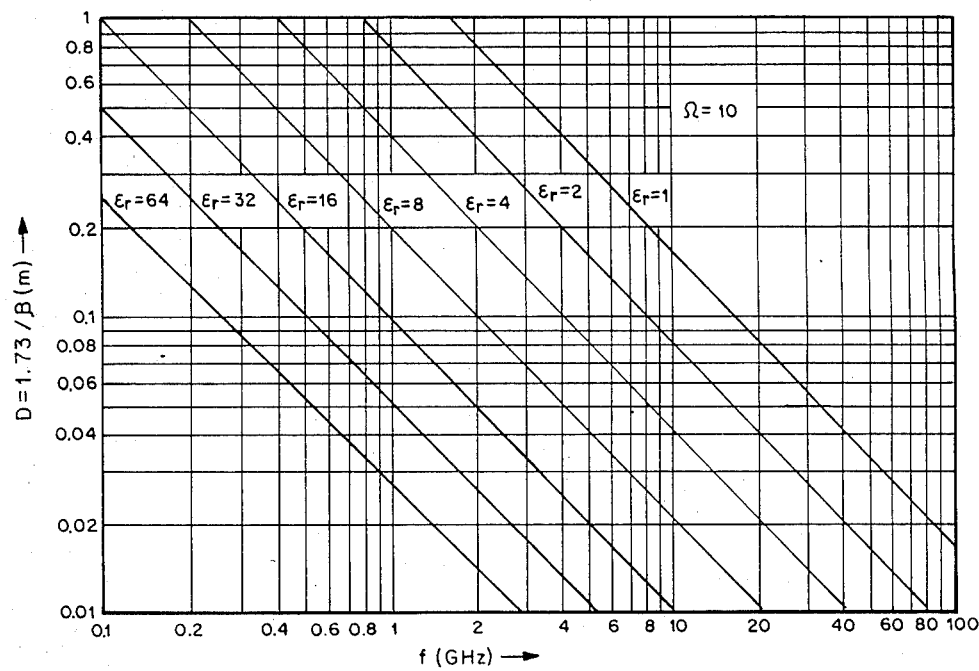
FIG. 8 is a graph of the thickness D of the absorbing material in FIG. 1 required for a value $\Omega=10$—or an attenuation of the power of the wave reflected at the metal surface by absorption to about 0.1 persent—as a function of the frequency f and the relative dielectric constant $\epsilon_r$.

Plots of D as a function of the frequency f and the relative dielectric constant $\epsilon_r$ are shown for $\Omega=2.5$ in FIG. 7 and for $\Omega=10$ in FIG. 8.

The required permeability constant $\mu$ of the absorbing material follows from the definitions of q by (9), the definition of $\epsilon$ and $\epsilon_r$ by (17), and the choice $q=1$ for impedance-matching between air and absorbing material $$\mu = \epsilon_r\mu_o = 1.256 \times 10^{-6}\epsilon_r \text{ [Vs/Am]}. \tag{20}$$

Figure 9:
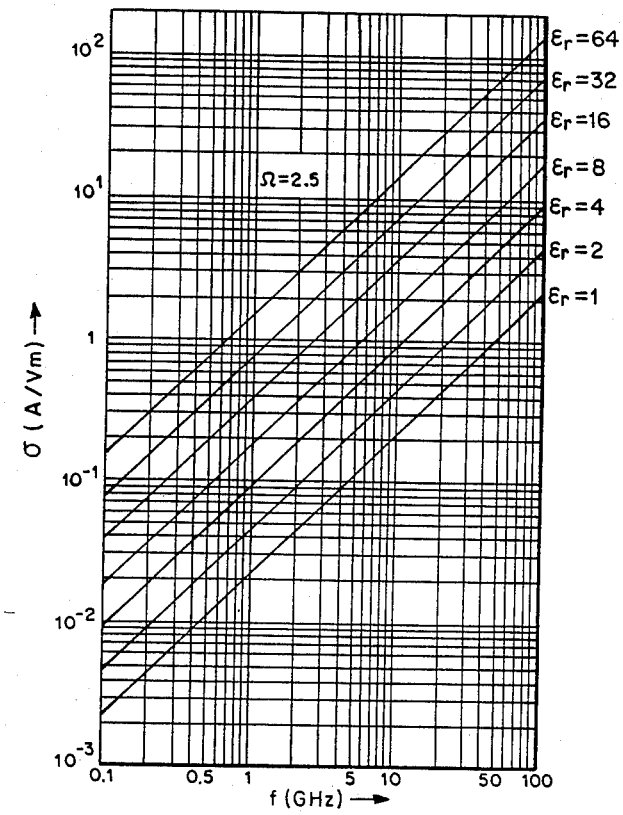
FIG. 9 is a graph of the conductivity $\sigma$ of the absorbing material in FIG. 1 required for the value $\Omega=2.5$—or an attenuation of the power of the wave reflected at the metal surface by absorption to about 1 percent—as a function of the frequency f and the relative dielectric constant $\epsilon_r$.
Figure 10:
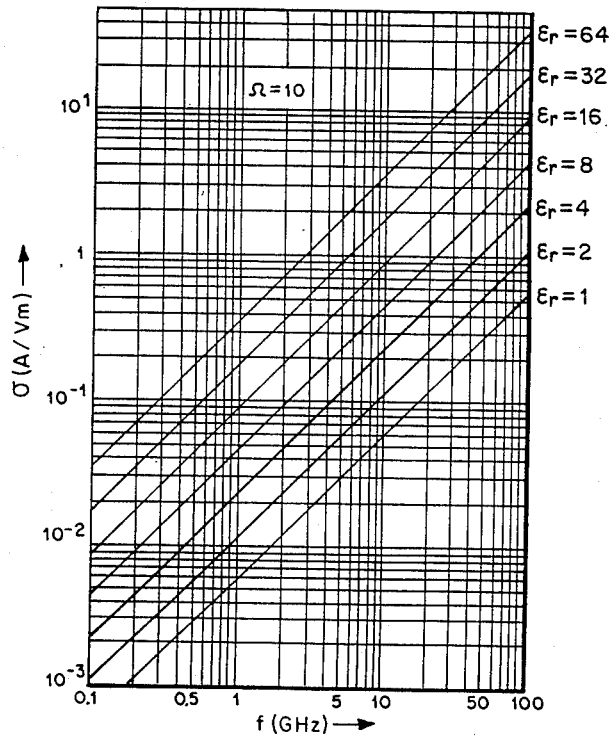
FIG. 10 is a graph of the conductivity $\sigma$ of the absorbing material in FIG. 1 required for the value $\Omega=10$—or an attenuation of the power of the wave reflected at the metal surface by absorption to about 0.1 percent—as a funcrion of the frequency f and the relative dielectric constant $\epsilon_r$.

The required conductivity $\sigma$ of the absorbing material follows from the definition of $\Omega$ in (9) and (17):

$$\sigma = 5.57 \times 10^{-2} f \epsilon_r / \Omega \quad [\text{A/Vm}] \quad (21)$$

where f has to be inserted in gigahertz. Plots of $\sigma$ as a function of the frequency f and the relative dielectric constant $\epsilon_r$ are shown in FIG. 9 for $\Omega = 2.5$ and FIG. 10 for $\Omega = 10$.

V. Effect on Radars with Small and Large Relative Bandwidth

Let us consider the effect of a coating of absorbing material over metal according to FIG. 1 on radar signals. There are three distinguished frequency ranges for a radar operating in the atmosphere: around 94 and 35 GHz, and below the water vapor resonance at 22.2 GHz. Molecular resonances of the oxygen molecule $O_2$ make other frequency bands below 100 GHz undersirable, while additional radar windows about 100 GHz will soon be excluded for other reasons.

A look at FIG. 7 shows that, for $\epsilon_r = 1$, the required thickness of the absorbing material equals about one wavelength. At 94 GHz, one needs thus a coating of about $D = 3$ mm, while somewhat less than $D = 1$ cm is required at 35 GHz. Hence, absorbing materials are very effective at these high frequencies, and one would not design a radar to work at these frequencies if one wanted it to be useful against targets using absorbing materials. (In heavy rain or fog, radars operating at 35 or 94 GHz suffer so much attenuation by absorption that their use is restricted to ranges in the order of hundreds of meter.)

FIG. 8 shows that a reflection of about 0.1 percent of the power requires, for $\epsilon_r = 1$, a coat of absorbing material that is approximately five wavelengths thick. One obtains $D = 1.6$ cm at 94 GHz, and $D = 5$ cm at 35 GHz, which are still practical values.

Let us return at this point to FIG. 2, and consider a conventional radar that uses sinusoidal pulses with 100 cycles. The function $e_1(t)$ and $e_2(t)$ are then such sinusoidal pulses. If the thickness of the absorbing material is one wavelength, the pulse $e_2(t)$ is delayed by two periods relative to $e_1(t)$ for $e_r = 1$. This delay yields $\Delta T' = \Delta T/50$. The case of FIG. 2(b) applies. Not only are the amplitudes A and B of $e_r(t)$ reduced by the absorbing material, but the duration of each of these pulses is only 2 percent of the original pulse duration $\Delta T$. The section of $e_r(t)$ denoted A+B in FIG. 2(b) can theorectically be made zero as we discussed with the help of FIG. 3. For a reduction of the reflected power to 0.1 percent, one needs an absorbing coating about five wavelengths thick, which implies a delay of 10 periods between $e_2(t)$ and $e_1(t)$, and $\Delta T' = \Delta T/10$. Again, the case of FIG. 2(b) applies.

In order to overcome absorbing materials, one must clearly replace the pulse diagram of FIG. 2(b) by that of (c) and in addition operate at such low frequencies that an absorbing coating of one wavelength thickness becomes impractical. The conventional radar cannot do so because it uses signals with a small relative bandwidth, but a radar with large relative bandwidth can accomplish the task.

Let us thus turn to lower frequencies and consider the range below the water-vapor resonance at 22.2 GHz. FIG. 7 shows, for $e_r = 1$, the thickness $D = 3$ cm at 10 GHz, and $D = 30$ cm at 1 GHz, for a reduction of the reflected power to 1 percent. A reduction of the power to 0.1 percent requires, for $\epsilon_r = 1$, the thickness $D = 16$ cm at 10 GHz, and $D = 1.6$ m at 1 GHz. A thickness of $D = 3$ cm implies a time shift $\Delta T' = 0.2$ ns between $e_1(t)$ and $e_2(t)$ in FIG. 2. For a pulse duration $\Delta T$ shorter than 0.2 ns, we achieve thus the case of FIG. 2(c) that permits no cancellation between $e_1(t)$ and $e_2(t)$. Note that one must use both a short pulse and *no* conventional carrier. The conventional technology would require a carrier frequency of about 500 GHz for a pulse duration $\Delta T = 0.2$ ns and a relative bandwidth $\eta = 0.01$. It would also achieve the pulse diagram of FIG. 2(c), but a thickness $D = 3$ cm of the absorbing coating would now equal 50 wavelengths, and the absorption could be made so effective that the distinction between FIG. 2(b) and (c) would become meaningless.

An increase of the relative dielectric constant reduces the required thickness D of the absorbing material, even at the lowest frequencies, to practically acceptable values according to FIGS. 7 and 8. Materials with $\epsilon_r$ in the range 2-4 are readily available, but they must have a relative permeability constant $\mu_r$ equal to $\epsilon_r$ according to (20) to be useful, and this requirement is hard to meet above 1 GHz. The requirement of (21), that the conductivity is proportionate to $\epsilon_r$, is more readily satisfied, since the values of $\sigma$ shown in FIGS. 9 and 10 for any value of $\epsilon_r$ can be achieved by means of carbon.

Let us turn to the question of how one can transmit a pulse as short as 0.1 ns without exceeding an upper frequency limit of about 10 GHz. The nominal bandwidth of such a pulse is 10 GHz. The conventional radar with $\eta = 0.01$ would call for a carrier frequency of 1000 GHz. We have already seen that such a signal is easy to absorb; indeed, the atmosphere will usually do the absorbing. On the other hand, by using the technology of the carrier-free radar, one may place a signal with a bandwidth of 10 GHz into the band 0.5 GHz $\leq f \leq$ 10.5 GHz, which results in a relative bandwidth $\eta = (10.5 - 0.5)/(10.5 + 0.5) = 0.91$. According to FIGS. 7 and 8 one would need absorbing coatings with a thickness of $D = 60$ cm and $D = 3.5$ m for $\epsilon_r = 1$ at the lower frequency limit $f = 0.5$ GHz. Coatings with anywhere near this thickness would strongly attenuate and phase shift the higher frequency components of a pulse with a duration in the order of 0.1 ns. As a result one would obtain a strong radar signature that would distinguish an object with a coating of absorbing material from objects without such a coating.

One can obviously change the parameters chosen here in many ways. However, the examples discussed certainly show the much greater potential of the radar with large relative bandwidth to overcome absorbing materials compared with the conventional radar using a small relative bandwidth, and we do not want to obscure this principle with details. We still want to discuss briefly two points: (a) Why did we just choose a lower frequency limit of 0.5 GHz, even though it is clear from FIGS. 7 and 8 that a limit of 0.1 GHz would be still better from the standpoint of combating absorbing materials? (b) We have assumed that the absorption is caused by ohmic losses due to the conductivity $\sigma$; does absorption caused by hysteresis losses due to the permeability $\mu$ change the result significantly?

VI. Lower Frequency Limit, Ferrite Absorbers

Figure 11:
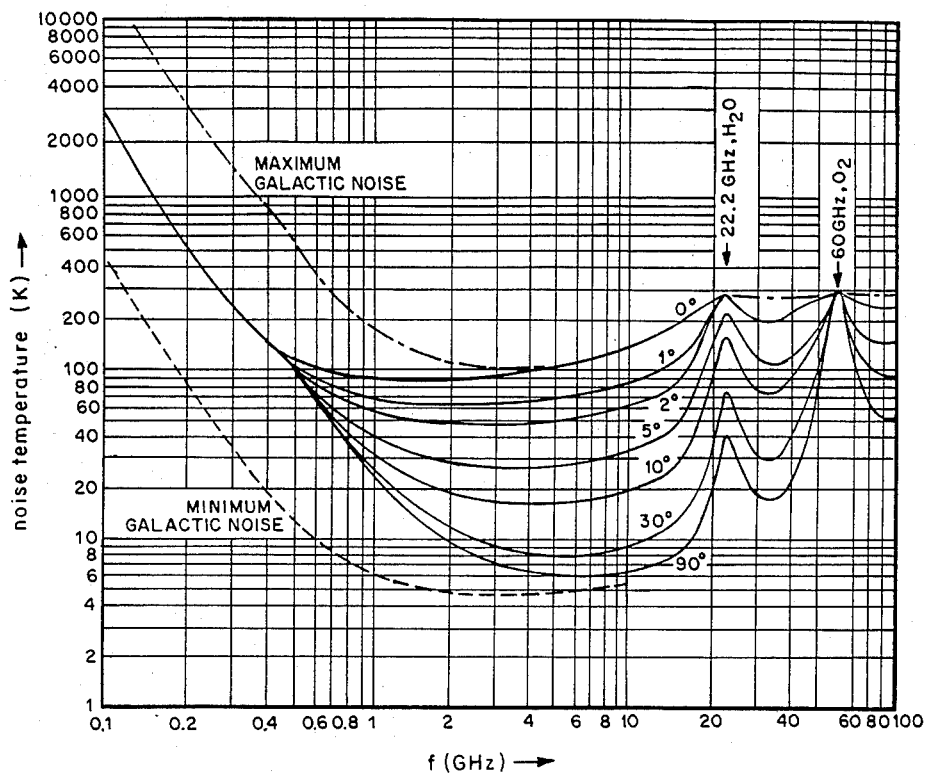
FIG. 11 is a graph of the noise temperature as a function of frequency for the elevation angles 0°, 1°,-90° of a receiving antenna.

The reason for using a lower frequency limit of 0.5 GHz is the sharp increase of the noise temperature below about 0.5 GHz. FIG. 11 shows plots of the noise temperature at sea level for various elevation angles of a receiving antenna. It is evident that the minimum noise occurs in the band from about 0.5 GHz to somewhat above 10 GHz. For low galactic noise, one may reduce the lower frequency limit to about 0.2 GHz, while for large galactic noise it should be increased toward 1 GHz. What one is interested in is, of course, the signal-to-noise ratio $P_S/P_N$, and there is no advantage in decreasing the reduction of $P_S$ by the absorbing material if this causes a greater increase of $P_N$ due to the higher noise temperature. However, if absorbing materials should ever be developed to such perfection that the use of radar in the preferred range above 0.5 GHz becomes ineffective, one can always shift to a lower frequency limit $f_L$.

Figure 12:
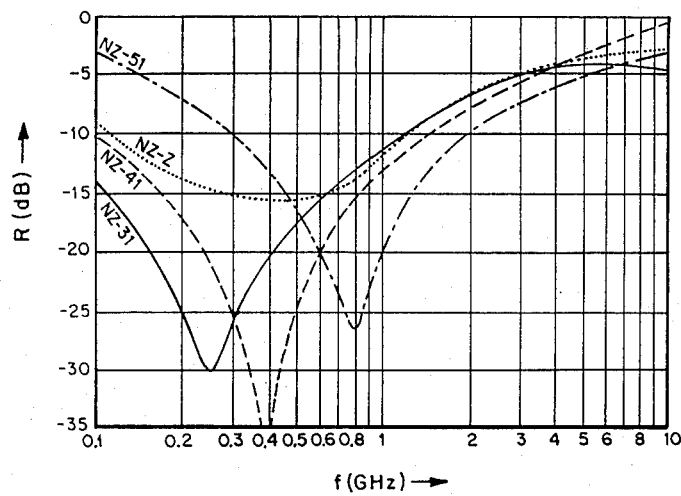
FIG. 12 is a graph of the reflectivity R of ferrite absorbers as a function of frequency. $R=-20$ db means that the power which would be reflected by the bare metal surface is reduced to 1% by covering it with absorbing material.

Consider next the use of ferrite materials for absorption, whose effect is based on hysteresis rather than ohmic losses. Such ferrite absorbers are commercially available, some under the trade name Eccosorb. (Eccosorb materials are products of Emerson & Cuming, Inc.) FIG. 12 shows the *reflectivity* of the materials Eccosorb NZ-2, NZ-31, NZ-41, and NZ-51 as a function of frequency. Reflectivity means the reduction of the reflected power if a metal plane is covered by the material as in FIG. 1. The data refer to (practically) infinitely long sinusoidal waves, which means for pulse-type signals that FIG. 12 applies to the overlapping sections of $e_1(t)$ and $e_2(t)$ in FIG. 2. We do not need to discuss here what the reflectivity for the nonoverlapping sections would be, since FIG. 12 shows clearly that ferrite absorbers work primarily in the band $0.1 \text{ GHz} \leq f \leq 1 \text{ GHz}$. A signal occupying the band $0.5 \text{ GHz} \leq f \leq 10.5 \text{ GHz}$ could thus lose not more than about 15 percent of its energy due to ferrite absorbers. This is too small an effect to require a more detailed discussion at this time.

The ferrite absorbers of FIG. 12 have a thickness of only 0.5–0.8 cm, which is substantially less than what we have obtained for ohmic absorbers below 1 GHz. On the other hand, their specific weight is about 4630 kg/m$^3$ while aluminum has a specific weight of 2600 kg/m$^3$. This limits the use of ferrites in airborne applications.

A more general lesson to be learned from FIG. 12 is that absorbing materials with a small relative bandwidth are of little help against radar signals with large relative bandwidth. For instance, the material NZ-51 has a reflectivity of at least $-20$ db (i.e., it reduces the reflected power to below 1 percent) in the approximate band $0.6 \text{ GHz} \leq f \leq 1 \text{ GHz}$, which implies a relative bandwidth $\eta = 0.4/1.6 = 0.25$, and this is not large enough to combat a signal occupying the band $0.5 \text{ GHz} \leq f \leq 10.5 \text{ GHz}$ with a relative bandwidth $\eta = 10/11 = 0.91$. Absorbing materials based on resonance have inherently a small relative bandwidth since the resonance effect disappears for large relative bandwidths. Hence, signals with large relative bandwidth are inherently good in overcoming resonating absorbers.

Let us end with a quote from the May 1970 report of Cronson and Proud titled "Wideband Antenna Development", (Rome Air Development Center, Rep. RADC-TR-70-74, May 1970, ASTIA DOC. AD 870,224, Nat. Tech. Inf. Service, Springfield, Va.,) which shows that the advantages of radar signals with large relative bandwidth, "nonsinusoidal radar signals," "carrier-free signals," or "video pulse signals" have been understood for some time: "Recently there has been increasing interest in antenna systems capable of transmitting and receiving fractional nanosecond video pulses. The very wide instantaneous bandwidth of these pulses presents challenging opportunities in radar identification and discrimination".

VII. Conclusions

Radar signals with large relative bandwidth occupying the approximate band $0.5 \text{ GHz} \leq f \leq 10.5 \text{ GHz}$ are effective for the detection of targets that use absorbing coatings to reduce the energy of the returned signals. Such radar signals have inherent all-weather capability since attenuation by rain, fog, and molecular resonances is insignificant in this frequency band, and the noise temperature is also at its minimum.

I claim:

1. A method of detecting an object that may be coated with material for preventing or attenuating reflections of incident electromagnetic wave energy comprising the steps of
    (i) generating pulses of electromagnetic wave energy whose relative bandwidth is greater than 0.85 in the band from about 0.1 GHz to about 12.0 GHz,
    (ii) directing those pulses of electromagnetic wave energy toward the object, and
    (iii) detecting reflections from said object of those pulses of electromagnetic wave energy which are incident on the object.
2. The method according to claim 1 wherein in step (i) at least some of the pulses are generated with a pulse duration in the range from 1 to 0.1 nanosecond.
3. The method according to claim 2, wherein in step (ii) at least some of the pulses directed toward the object are carrier-free pulses.

* * * * *